June 8, 1926.

P. N. LATUFF 1,587,847

SAW JOINTER

Filed Feb. 11, 1924

Inventor

Peter N. Latuff.

By Fischer & Lagaard

Attorneys

Patented June 8, 1926.

1,587,847

UNITED STATES PATENT OFFICE.

PETER N. LATUFF, OF ST. PAUL, MINNESOTA.

SAW JOINTER.

Application filed February 11, 1924. Serial No. 691,976.

My invention relates to saw jointers and has for its object to provide a device adapted to be used in dressing up the teeth of circular saws after the same have been sharpened and set in the usual manner.

An object of the invention resides in providing a device which is adapted to dress the extreme points of the teeth so as to make the saw of uniform diameter across any of the teeth thereof.

Another object of the invention resides in dressing the teeth points along the sides of the same so as to cause all of the teeth to project an equal amount outwardly beyond the sides of the saw proper so as to provide uniform clearance and cutting qualities for all of the teeth.

Another object of the invention resides in providing a base having a number of detachable mandrels of different sizes mounted thereon upon which the circular saw may be placed.

A still further object of the invention resides in providing an adjustable support adapted to be mounted upon any of said mandrels which support is formed with clamping means adapted to hold a file in either of two positions to file the exterior edges or the sides of the points of the teeth of the saw.

Another object of the invention resides in forming said support with means whereby the same may be adjustably attached to any of the mandrels mounted upon said base.

The full objects and advantages of my invention will be found in the detailed description thereof and are particularly pointed out in the claims.

Figure 1:
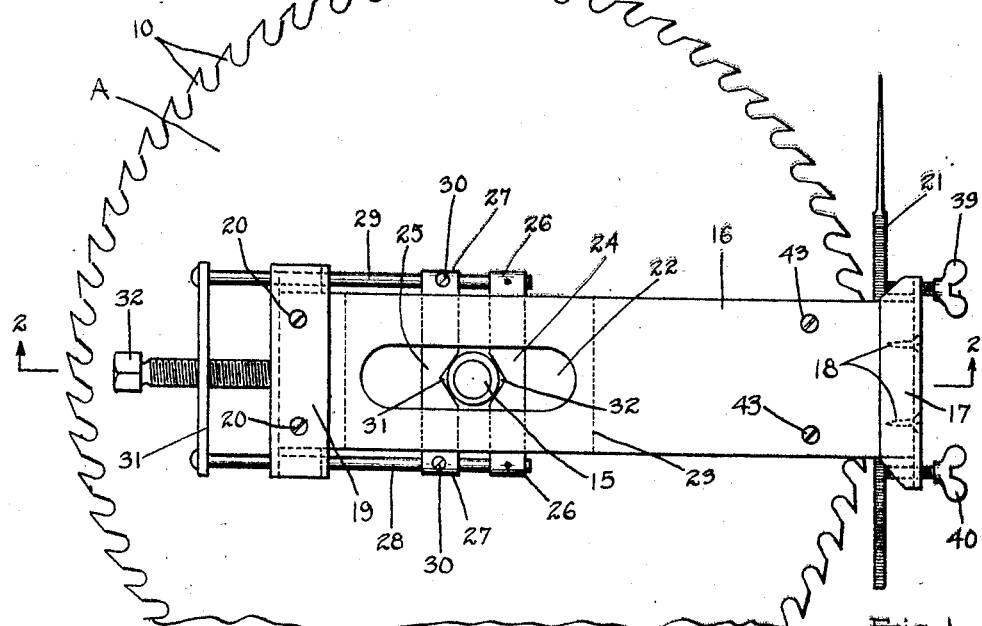
Figure 1 is an elevational view of my invention showing the same applied to a circular saw used in dressing the exterior periphery of the teeth thereof.
Figure 2:
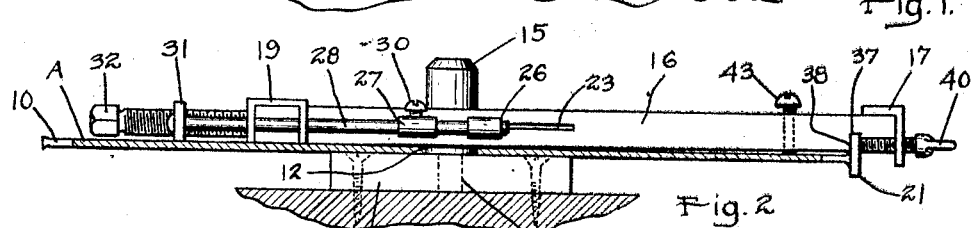
Figure 2 is a sectional view taken substantially on line 2—2 of Figure 1.

In the use of circular saws, the same upon becoming dull are sharpened either by filing or grinding until the worn points of the teeth have been brought to a sharp point. The extreme points of the teeth are then set by swaging the same until the extreme points of the teeth spread outwardly beyond the sides of the saw proper. After this setting has been accomplished it frequently occurs that some of the teeth receive different degrees of set than others, which cause them to project outwardly beyond the periphery of the saw or to the sides thereof, to a more or less varying extent. This has the effect of causing the saw to operate inefficiently and to cut with an irregular cut which is highly undesirable, particularly with the saw that runs at a high rate of speed. My invention overcomes these disadvantages by providing a saw whereby the teeth of the saw may readily be dressed at the extreme points thereof both along the periphery of the said teeth and along the sides of the same.

In the drawings I have illustrated a circular saw A having teeth 10 formed along the periphery thereof, and formed with a bore 12 extending through the center of the same. The saw A may be of usual construction, the teeth 10 being cut in accordance with the requirements for which the saw is to be used. The teeth 10 are usually set along the extreme points thereof which causes the said points to become slightly wider than the thickness of the saw proper as indicated at 11 in Figure 3. This is for the purpose of causing the saw to clear itself as the material through which the saw passes is cut. Although I have shown a saw of a particular formation in the drawings, it can readily be understood that the invention may be used with any type of a circular saw, as will become apparent in the following description.

The circular saw A is mounted upon a base 13 which may be attached to the side of the work bench or to any suitable structure which would make it convenient to manipulate the device in dressing the teeth of the saw as required. This base 11 is tapped at its center at 14 to receive a number of mandrels, one of which is indicated at 15. These mandrels are of different diameter and are adapted to snugly fit within the bores 12 of the various saws to be dressed. By selecting the proper mandrel 15 and screwing it into the threaded socket 14 in base 13, a support is provided upon which the saw A may be placed so that the same can be readily rotated as the teeth thereof are operated upon. In the drawings I have simply illustrated a single saw A and its corresponding mandrel 15, though as before stated, the adaptation of the invention to saws of other sizes and uses may readily be comprehended.

The invention primarily consists of a support 16 in the shape of a bar which may be constructed of wood, metal or any other suitable material. Upon one end of this bar is mounted an angle iron head 17 which is attached thereto by screws 18 and at the other end of said bar is mounted a similar angle iron head 19 attached to the same by screws 20. To the angle iron bar 19 is connected a mechanism for securing and journalling support 16 upon the mandrel 15 while upon the angle iron head 17 is provided means whereby a file such as indicated at 21 may be securely clamped to file the corners of the teeth 10 of the saw A as will be presently described. Along the center of the support 16 is formed an elongated opening 22 through which the mandrel 15 may extend. This opening is so positioned relative to support 16 that the head 17 may extend outwardly beyond the teeth 10 of the largest saw desired to be dressed and may further extend inwardly beyond the said teeth 10 of the smallest size of saw to be dressed. In conjunction with the opening 22 I provide a slot 23 which extends transversely of the opening 22 completely through the member 16, being of a length slightly greater than that of said opening. Within this slot is slidably mounted two bars 24 and 25 both of which are formed with hinge-like ends 26 and 27 adapted to fit around two rods 28 and 29, lying adjacent the edges of the support 16. The members 26 are rigidly secured to the ends of the rods 28 and 29 while the members 27 are adapted to slide along the same so that the distance between the two bars 24 and 25 may be varied at will. Two set screws 30 on these members serve to hold the bar 25 in fixed relation after the same has been properly set as required. Along the centers of the two bars 24 and 25 are two V-shaped slots 31 and 32 which face one another and are adapted to engage the exterior surface of the mandrel 15 when the said bars are brought toward one another. With this arrangement a structure is formed whereby the support 16 may be centered relative to mandrel 15 and journalled thereon. It can further be seen that bars 24 and 25 may be adjusted to fit upon any size of mandrel so that the entire invention may be used in conjunction with different saws without removal or replacement of the parts thereof. After the set screws 30 have been applied to hold the bars 24 and 25 in place the same, together with the rods 28 and 29, may be slid as a unit along the slot 23 in support 16 to permit of adjusting the position of head 17 relative to the teeth 10 of saw A.

Figure 5:
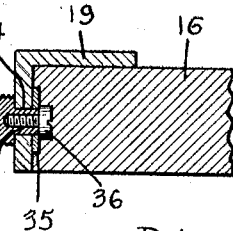
Figure 5 is a detail sectional view of the adjusting mechanism drawn to an enlarged scale.

For adjusting rods 28 and 29 relative to support 16 the following structure is used. Rods 28 and 29 pass through the angle iron head 19 and extend outwardly beyond the same where said rods are rigidly secured to a bar 31. A screw 32 is screwed into the center of this bar and engages the angle iron head 19. This screw is swivelly connected thereto as shown in detail in Figure 5. As will be noted, the end of the screw 32 is reduced as indicated at 33 and passes through a bore 34 in the flange of angle iron 19 in alinement with the axis of screw 32. A washer 35 is positioned adjacent the end of the portion 33 of screw 32 and the inner surface of the flange of head 19 and is held in place by means of a cap screw 36 which is screwed into the portion 33 of said screw. With this arrangement the screw 32 may be freely turned in either direction while the head 19 at all times remains attached to the end thereof. Since the bar 31 is threaded to receive screw 32 upon rotation of said screw, bars 24 and 25 are caused to move relative to the support 16 so that head 17 thereof may be adjusted relative to the mandrel 15 as previously brought out.

Figure 4:
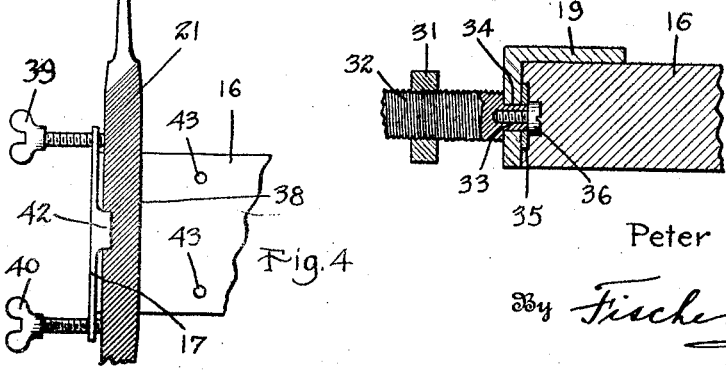
Figure 4 is a fragmentary view taken on line 4—4 of Figure 3.

The file 21 is adapted to be held in the head 17 in either of two positions as shown in Figures 1 and 4. When the device is to be used to dress the peripheral edges of the teeth the file is positioned edgewise as shown in Figure 1, whereas, when the same is to be used for dressing the sides of the teeth, the same is positioned flatwise as shown in Figure 4. The file 21 is held in place in head 17 as follows: In the support 16, a short distance from the end of the same, is cut a transverse groove 37 which is of a width just sufficient to permit the file 21 to be inserted edgewise therein, forming a shoulder 38 on the inner side thereof. The head 17 as shown in Figure 1 extends outwardly beyond the sides of support 16 and is provided with two set screws 39 and 40 tapped into the same, which are so positioned that they may bear against the file 21 and hold the same seated upon the shoulder 38 previously described. With the structure so arranged the entire support 16 with the file 21 attached thereto may be rotated upon the mandrel 15 so as to run the file 21 circumferentially around the exterior of the teeth 10 to dress the points thereof and make the saw of uniform diameter throughout. By adjusting the screw 32 the depth of cut can be regulated and the file brought closer toward the center of the saw as the teeth become dressed.

Figure 3:
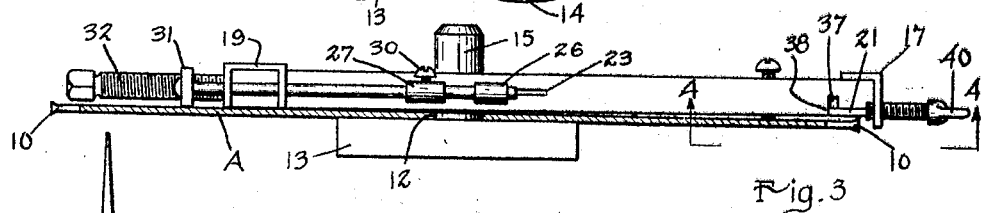
Figure 3 is a view similar to Figure 2 illustrating the application of the device for dressing the sides of the points of the teeth.

In addition to the groove 37 a recess 41 is provided upon the end of the support 16 which is of a depth such that the file 21 will fit within the same and project a trifle beyond the lowermost surface of member 16. This recess communicates with the groove 37 and permits the file to be placed flatwise relative to the member 16 as clearly illustrated in Figure 4 with the edge of the file resting against the shoulder 38 instead of the face of the file as in the other application of the invention. The set screws 39 are so arranged that the same engage the edge of the file 21 when positioned as shown in Figure 3 to force the same against the shoulder 38 and hold the same in operating position similar to the manner shown in Figure 1, excepting that the file is turned the other way. To prevent the set screws 39 from slipping off from the edge of the file a keeper 42 is provided which is formed on the edge of the head 17 by turning over a portion of the flange thereof as clearly brought out in Figure 4. When using the device with the file so positioned the screw 32 is rotated so that the head 17 is drawn inwardly in order that the file 21 may rest upon the portions 11 of teeth 10 as clearly shown in Figure 3. In order that the amount removed from these corners of the teeth may be controlled two screws 43 are employed which are screwed into the support 16 and project a short distance beneath the under surface of the same and engage upon the surface of the saw A. These screws serve as stops and limit the distance of the cutting edge of file 21 from the surface of said saw so that as the member 16 is rotated file 21 is maintained the same distance from the surface of the saw, thereby cutting and dressing the sides of the corners of teeth 10 so that the same project outwardly beyond the surface of the saw the same distance throughout.

With my invention a saw may be quickly and effectively dressed so that the teeth of the same are perfectly uniform throughout. All of the unevenness occasioned by setting the teeth may be eliminated so that the saw is of the same diameter throughout and so that the set of the teeth extends the same distance outwardly beyond the surface of the saw for each tooth or beyond the sides thereof. After the screws 43 have been set the same need not be altered unless a different amount of set is required, so that the device may be used repeatedly by merely interchanging the position of the file for the two operations. The device is extremely simple and effective and when once the file has been worn out, a new file may be readily replaced and inserted in the device so that the same may be at all times in condition for use.

In accordance with the patent statutes I have described my invention, illustrating the best embodiment thereof, but I desire to have it understood that the invention can be carried out by other means and applied to uses other than those above set forth within the scope of the following claims.

I claim:

1. A saw jointer comprising an arm having a longitudinal opening formed therein, a base, a mandrel formed on said base adapted to rotatably support a saw and to pass through said opening, a guideway formed on said arm, a journal movable along said guideway for journalling said arm upon said mandrel, means for adjustably moving said journal with said mandrel along said guideway and dressing means attached to the end of said arm.

2. A saw jointer comprising an arm having a longitudinal opening formed therein, a base, a mandrel formed on said base adapted to rotatably support a saw and to pass through said opening, a guideway formed on said arm, a bar movable along said guideway, a pair of rods secured to said bar, a second rod movable along said bars toward and away from said first bar, said bars being formed with complementary journals adapted to engage said mandrel, means for holding said movable bar in fixed position relative to said rods, a third bar secured to the end of said rods and a threaded member screwable in said third bar and swivelly connected to said arm for adjusting said journal relative to said arm and dressing means positioned upon the end of said arm.

PETER N. LATUFF.